Sept. 20, 1949.  R. MUSAL  2,482,688
MAGNETIC COMPASS MOUNTING
Filed July 21, 1945
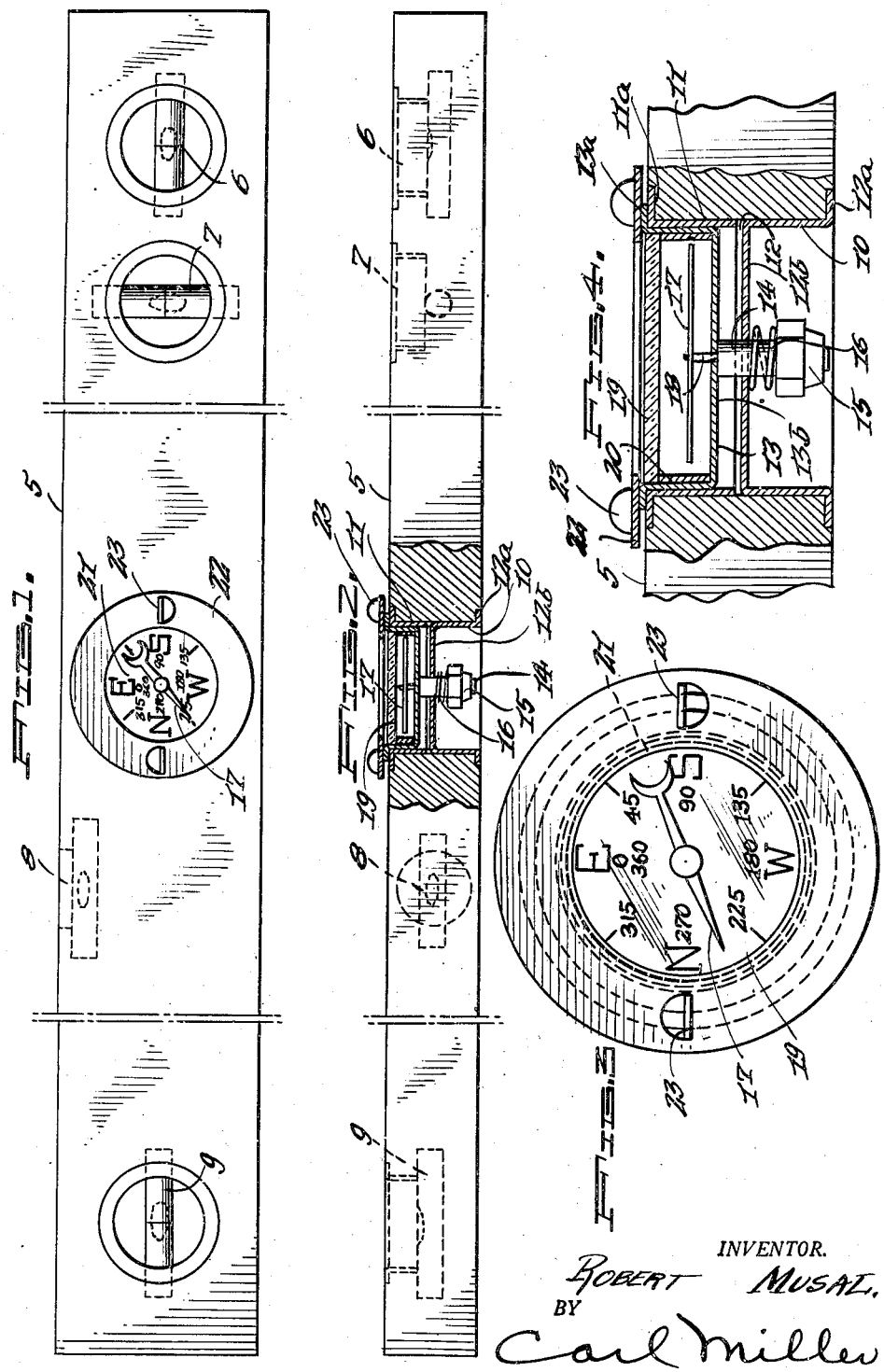
INVENTOR.
Robert Musal.
BY
Carl Miller
ATTORNEY.

Patented Sept. 20, 1949

2,482,688

UNITED STATES PATENT OFFICE 2,482,688

MAGNETIC COMPASS MOUNTING

Robert Musal, Maple Heights, Ohio

Application July 21, 1945, Serial No. 606,366

1 Claim. (Cl. 33—222)

This invention relates to an improved spirit level, and one of the objects of the invention, is to provide a level of this type with a compass having a magnetic needle to show north position, and a scale divided into degrees of the circle, so that the needle will indicate angular positions for the building of a foundation or house, or the laying out of a garden or other plot, the housing for the needle being mounted for independent rotary adjustment on the frame of the level, so that the levelling use may be carried out simultaneously with the angle determining use of the level.

Another object of the invention is to provide a combined level and direction compass, wherein the housing of the compass is provided with a spring pressed housing cup, which may be manually turned so that the scale of the compass may be properly adjusted with relation to the line being laid out to establish the base for the foundation, building or land plot, and then adjusted to establish lines at right angles or at any other required angles to the base line, in developing the area limits which will govern the laying of the foundation or the building of the house, or the marking out of the land or garden plot.

With the above and other objects in view, the invention comprises certain new and useful constructions, combinations and arrangements of parts, clearly described in the following specification, and fully illustrated in the accompanying drawings, in which:

Fig. 1 is a side elevation of the improved level.

Fig. 2 is an edge view thereof, with the housing for the compass shown in section.

Fig. 3 is a side view of the compass.

Fig. 4 is a vertical sectional view through the compass, showing the spring tensioning means, taken on an enlarged scale.

Referring to the accompanying drawings, which illustrate the invention, 5 designates the frame of the level, which may be constructed of wood or other suitable material. This frame is equipped with spirit level vials 6 and 7, which are located near one end thereof, a spirit level vial 8, which is located near the median position of the frame, and another spirit level vial 9, located near the opposite end of the frame.

These various spirit level vials are of conventional construction, and are employed to determine the levels of horizontal surfaces, or the perpendicular positions of upright objects.

In the laying of foundations and the placement of building supports, when no foundation is established, and in the laying out of land and garden plots, it is not always practical nor possible to secure the services of a civil engineer or surveyor, and the man having the immediate responsibility for laying out the work or plot may not be informed and skilled in the use of trigonometry or geometry, and therefore unable to accurately calculate angular relations of sides of a foundation or plot.

The present invention is designed to equip a standard carpenter's level with means for utilizing a magnetic compass to establish the relative angular relation of the sides of any area upon which a foundation is to be laid out or a plot to be established, so that the services of a civil engineer or surveyor may be dispensed with and a person unskilled in the use of trigonometry or geometry may be able to satisfactorily complete the work.

The invention is carried out by means of the housing tubes 10 and 11, which are fitted through opposite ends of the transverse opening 12 of the main frame 5. The tube 10 is formed with an external flange 12a, which is nested in a recess formed in the frame 5, and is provided with an integral end wall 12b, at the inner end of the tube. The tube 11 is provided with an external flange 11a, which is nested in a recess formed in the side of the frame 5. The inner end of the tube 11 is open and is disposed close to the integral end wall 12b of the tube 10. These tubes are formed of brass or other material which does not rust on exposure.

In the tube 11 a metal cup 13 is mounted to turn, and this cup is formed with an external flange 13a which has a sliding bearing on the flange 11a of the tube 11.

The end wall 13b of the housing cup 13 is equipped with an axial bearing 14, which extends through the end wall 12b of the tube 10, and a nut 15 is threaded on this bearing against a coil spring 16, which encloses the bearing. The inner end of the bearing 14 is soldered or otherwise permanently connected to the end wall 13b.

A magnetic needle 17 is arranged to turn in the housing cup 13 upon a shaft 18, which is suitably supported on or in the bearing 14. A glass disc 19 is supported outwardly of the magnetic needle 17 by means of the spacing ring or tube 20. The outer face of the end wall 13b is provided with a compass dial 21, which is divided into degrees of a circle, and into points of the compass, as North, South, East and West, and intermediate points.

A plate ring 22 is soldered or permanently connected to the flange 13a of the tube 13, and is provided with struck-out finger lugs 23, located on opposite sides thereof, so that the entire inner assembly, including the housing cup 13, the glass disc, and the spacing ring may be turned, so that the position of the dial 21 may be changed by manual operation. The spring 16 maintains the flange 13a of the tube 13 in pressure contact with the flange 11a of the tube 11, so that sufficient friction is maintained between the engaging surfaces of the two flanges, which serves to hold the inner cup 13 against accidental turning.

In using the combined carpenter's level and compass, a base line is first established and the necessary levelling made. The frame 5 is then placed against the base line and the spirit vials 6, 7 and 9 checked to determine the level position of the frame 5. The housing 13 is then turned by means of the ring 22, so that the north mark of the dial 21 will coincide with the north end of the magnetic needle 17. From this base line then the sides of the foundation or plot may be laid out, by using the position of the magnetic needle on the dial as a guide, when the frame 5 is shifted to level the sides of the foundation or plot. If you desired to establish a parallel line, the compass will point to north and south, to indicate the direction of such a line. If a right angular line is to be established, the compass will point east and west, when the frame is turned at right angles to the base line. If a line is to be established which is less than a right angle, then the compass will accurately indicate the direction and the angle, when the frame 5 is shifted accordingly.

The construction and detail mounting of the magnetic needle is to be in accordance with standard compass construction.

It is understood that all materials useful for the construction may be employed, and that various changes may be made in the details of construction, their combination and arrangement, within the scope of the invention, as defined by the claim hereof.

Having described the invention, I claim as new:

In a leveling frame, a magnetic compass having a housing and a magnetic needle rotatable in the housing on an axis perpendicular to the general plane of the frame, a pair of aligned tubes disposed in an opening extending transversely through said frame from front to back, said housing for the compass rotatably mounted in one of the tubes for rotation about said axis, a transverse portion in the inner end of the other tube, a projection upon the inner portion of said compass housing extending through said transverse portion of the other tube, spring means engaging said projection and resiliently applying tension thereto to hold the housing and compass in the opening and prevent outward displacement thereof, said compass housing having a flange to prevent the inward movement of the compass through the tube and a plate ring connected to the flange with struck out lugs for effecting the adjustment of the compass.

ROBERT MUSAL.

REFERENCES CITED

The following references are of record in the file of this patent:

UNITED STATES PATENTS

| Number | Name | Date |
|---|---|---|
| 610,952 | Stettler et al. | Sept. 20, 1898 |
| 898,092 | Carrier | Sept. 8, 1908 |
| 1,221,738 | Isom | Apr. 3, 1917 |
| 1,304,789 | Marion | May 27, 1919 |
| 1,665,715 | Noisom | Apr. 10, 1928 |
| 1,822,340 | Dodd | Sept. 8, 1931 |
| 1,944,104 | Niedermann | Jan. 16, 1934 |
| 2,169,342 | Hewitt, Jr. et al. | Aug. 15, 1939 |